R. W. PECK.
Valve.

No. 222,727.  Patented Dec. 16, 1879.

WITNESSES:
Charles C. Stetson
E. B. Bolton

INVENTOR:
Richard W. Peck
by his attorney

UNITED STATES PATENT OFFICE.

RICHARD W. PECK, OF NEW YORK, N. Y., ASSIGNOR TO HIMSELF, JOHN LYNCH, OF SAME PLACE, AND LYMAN HOWARD, OF ESSEX, CONN.

IMPROVEMENT IN VALVES.

Specification forming part of Letters Patent No. 222,727, dated December 16, 1879; application filed June 19, 1879.

*To all whom it may concern:*

Be it known that I, RICHARD W. PECK, of New York city, in the State of New York, have invented certain new and useful Improvements relating to the Construction of Valves for use in Pumps and in analogous situations; and I do hereby declare the following is a full and exact description thereof.

I make a valve which presents two faces, capable of being reversed and used until both faces are worn or injured.

I make the faces of rubber, but peculiarly formed and combined with a strong open-work support or skeleton of metal, which gives it the strength and rigidity desired.

My valve may be conveniently made, is cheap, noiseless, adapted for violent action and high pressure, if required, and is likely to be durable.

I will describe the invention as applied to valves which rise and sink bodily, in the manner known as "puppet-valves," guided by a stem in the center; but it will be understood that my invention is capable of being applied to valves otherwise guided, or even to valves of a different class, as hinged valves.

The accompanying drawings form a part of this specification, and, as before intimated, represent the invention in the form of a puppet-valve guided by a stem in the center.

Figure 1:
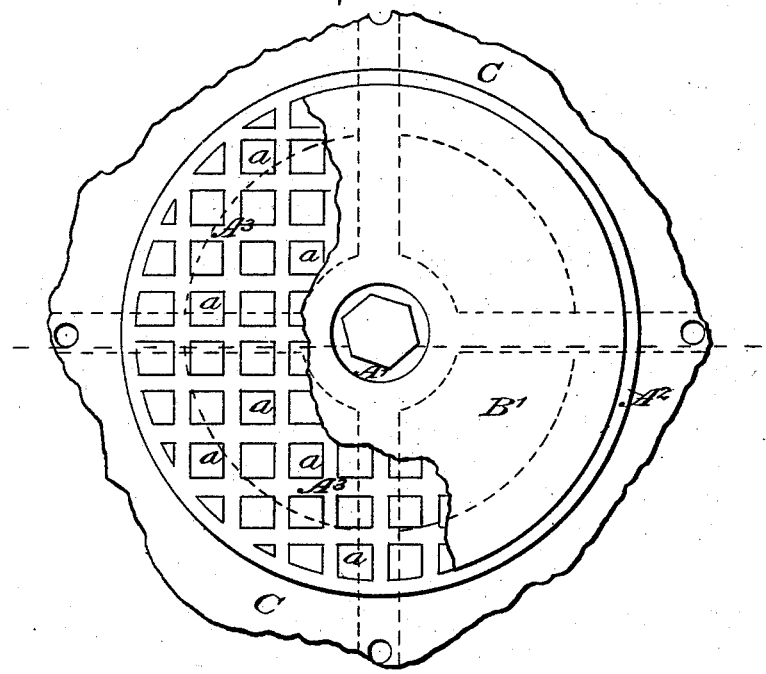
Figure 2:
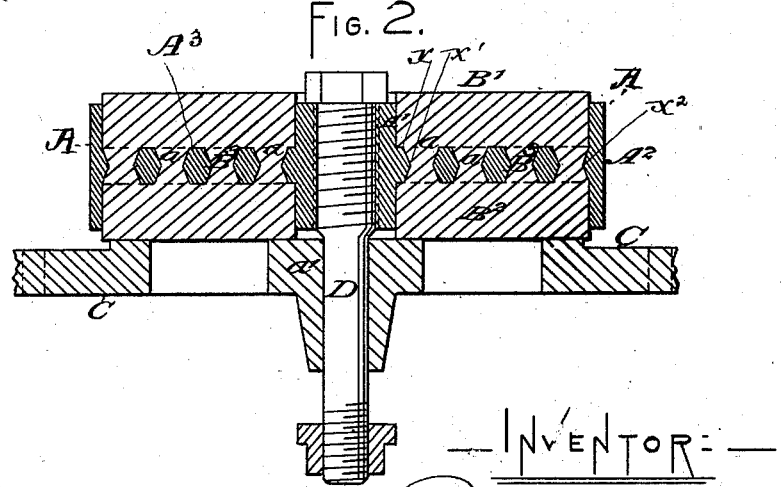

Figure 1 is a face view, with a portion of the rubber removed to show the metal work in the interior of the rubber. Fig. 2 is a central cross-section of the valve and a portion of the seat.

Similar letters of reference indicate like parts in both the figures.

I employ a skeleton, A, of brass or other suitable strong metal.

I have designated certain parts by additional marks, $A'$ $A^2$ $A^3$. $A'$ is a hub, having a little less thickness than the valve is to finally attain. $A^2$ is a rim of corresponding thickness. $A^3$ are cross-bars, leaving considerable open spaces between them. All the parts, $A'$ $A^2$ $A^3$, are formed together in one strong casting.

I combine with this skeleton $A'$ $A^2$ $A^3$ a mass of vulcanized india-rubber, adapted to present a fair face of rubber above and below. One face is marked $B'$; the opposite face is marked $B^2$; the intermediate rubber which extends through the spaces between the bars $A^3$ is marked $B^3$.

The rubber is molded together in a single mass, being applied in a plastic state and cast to completely fill all the spaces, and vulcanized, the spaces being inclosed with suitable metal, as represented, and treated in all respects in the same manner as in vulcanized rubber.

There are known in steam-engineering and pump-work two grades of relatively soft rubber. The hardest, although differing very widely from the hard material used for buttons, pen-handles, and analogous articles, is technically known among engineers as "hard rubber." I prefer that grade of rubber for my valve; but I believe the softer variety, known as "soft rubber," may serve with some success.

It is important that the rubber $B'$ $B^2$ protrude its faces beyond the plane of the parts $A'$ $A^2$. This allows the valve to strike on a plane surface and the shock to be entirely received on the rubber; but the valve may be used with some success with the rubber flush with the metal, or even a little sunk below the edges, by giving the seat a corresponding form, as indicated in Fig. 2, where C represents the seat.

The valve is shown as guided by a pin, D, which is secured firmly in the center $A'$ in the casting by the aid of screw-threads, as represented.

Modifications may be made. The cross-bars may form diamonds instead of squares. The spaces in the casting may be considerably elongated. They may be made coarser or finer than is here shown. The metal may be tinned or galvanized iron instead of brass.

Any metal which possesses sufficient strength and is adapted to serve with rubber in this manner may be used.

It will be observed that my valve is reversible, and presents a similar flexible face upon either side.

I claim as my invention—

The reversible frame or skeleton A, composed of the hub $A'$, periphery $A^2$, and connecting-bars $A^3$, combined with the rubber filling $B'$ $B^2$ $B^3$, as shown, $B'$ projecting beyond one face of the skeleton $A'$, $B^2$ extending beyond the opposite face, and $B^3$ filling the spaces between the bars $A^3$, and directly connecting the faces $B'$ and $B^2$, as and for the purposes set forth.

In testimony whereof I have hereunto set my hand this 18th day of June, 1879, in the presence of two subscribing witnesses.

RICHARD W. PECK.

Witnesses:
 ED. W CHAMBERLAIN,
 CHARLES C. STETSON.